US010017865B2

(12) United States Patent
Zhu et al.

(10) Patent No.: US 10,017,865 B2
(45) Date of Patent: Jul. 10, 2018

(54) ELECTROCHEMICAL METHOD FOR PRODUCING PURE-OXYGEN GAS AND OXYGEN-LEAN GAS FROM OXYGEN-CONTAINING GAS MIXTURES

(71) Applicant: DALIAN UNIVERSITY OF TECHNOLOGY, Liaoning (CN)

(72) Inventors: Xiaobing Zhu, Liaoning (CN); Weikun Zhu, Liaoning (CN); Aimin Zhu, Liaoning (CN); Jinglin Liu, Liaoning (CN); Xiaosong Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 274 days.

(21) Appl. No.: 15/034,058

(22) PCT Filed: Nov. 4, 2014

(86) PCT No.: PCT/CN2014/090252
§ 371 (c)(1),
(2) Date: May 3, 2016

(87) PCT Pub. No.: WO2015/067165
PCT Pub. Date: May 14, 2015

(65) Prior Publication Data

US 2016/0265122 A1 Sep. 15, 2016

(30) Foreign Application Priority Data

Nov. 5, 2013 (CN) .......................... 2013 1 0542196

(51) Int. Cl.
*C25B 15/02* (2006.01)
*C25B 15/08* (2006.01)
(Continued)

(52) U.S. Cl.
CPC .................. *C25B 9/04* (2013.01); *C25B 1/04* (2013.01); *C25B 9/18* (2013.01); *C25B 15/02* (2013.01);
(Continued)

(58) Field of Classification Search
CPC .............. C25B 15/02; C25B 9/04; C25B 1/04
See application file for complete search history.

(56) References Cited

U.S. PATENT DOCUMENTS 5,547,494 A 8/1996 Prasad et al.
2002/0153263 A1 10/2002 Velev
(Continued)

FOREIGN PATENT DOCUMENTS

CN 1141207 A 1/1997
CN 1461824 A 12/2003
(Continued)

OTHER PUBLICATIONS

International Search Report for PCT/CN2014/090252, dated Feb. 11, 2015 in English and Chinese Language.
(Continued)

*Primary Examiner* — Brian W Cohen
(74) *Attorney, Agent, or Firm* — Smith, Gambrell & Russell, LLP

(57) ABSTRACT

The present invention relates to an electrochemical method for continuously producing a pure-oxygen gas and an oxygen-lean gas from an oxygen-containing gas mixture. At least two water electrolyzer units and two power supply units are used, of which each former solely corresponds to each latter, respectively. The two power supply units are at least one power supply unit of recycling hydrogen energy and an externally-connected power supply unit. The power supply unit of recycling hydrogen energy consists of hydrogen fuel cells, and the externally-connected power supply
(Continued)

unit is comprised of at least one of the following cells and/or power supply, e.g. (a) solar cell(s), (a) direct methanol fuel cell(s), and/or an AC grid. In terms of the electrical circuit, each power supply unit is solely connected with the corresponding water electrolyzer unit. Hydrogen produced by all the water electrolyzer units is delivered to feed the hydrogen fuel cells as a fuel, and oxygen produced by the water electrolyzer units is the pure oxygen of target product. A negative electrode and a positive electrode of the hydrogen fuel cells of the power supply unit of recycling hydrogen energy are fed by the hydrogen gas and an oxygen-containing gas mixture, respectively. The inlet hydrogen gas is connected with a cathode of hydrogen chamber of the water electrolyzer unit through a pipe. A gas-liquid separation is performed at the outlet of positive electrode, of which the outlet gas is produced as an oxygen-lean gas. By means of the present invention, a high-purity oxygen gas can be stably and continuously produced from air at low cost for any indoor and outdoor sites or a remote area.

7 Claims, 1 Drawing Sheet

(51) Int. Cl.

| | |
|---|---|
| ***C25B 9/04*** | (2006.01) |
| ***C25B 1/04*** | (2006.01) |
| ***H01M 8/18*** | (2006.01) |
| ***H01M 8/1007*** | (2016.01) |
| ***H01M 16/00*** | (2006.01) |
| ***C25B 9/18*** | (2006.01) |
| *H01M 8/1011* | (2016.01) |

(52) U.S. Cl.

CPC ........... *C25B 15/08* (2013.01); *H01M 8/1007* (2016.02); *H01M 8/184* (2013.01); *H01M 16/003* (2013.01); *H01M 8/1011* (2013.01); *Y02E 60/366* (2013.01); *Y02E 60/523* (2013.01); *Y02E 60/528* (2013.01); *Y02E 70/10* (2013.01); *Y02E 70/20* (2013.01); *Y02P 20/132* (2015.11); *Y02P 20/134* (2015.11)

(56) References Cited

U.S. PATENT DOCUMENTS

| | | | | |
|---|---|---|---|---|
| 2004/0013923 | A1* | 1/2004 | Molter | H01M 8/04089 429/413 |
| 2004/0146759 | A1 | 7/2004 | Hecker et al. | |
| 2005/0136299 | A1 | 6/2005 | Richey et al. | |
| 2005/0236278 | A1* | 10/2005 | Shoup | C02F 1/461 205/628 |
| 2011/0200899 | A1* | 8/2011 | Mata | H01M 8/04201 429/428 |

FOREIGN PATENT DOCUMENTS

| | | | |
|---|---|---|---|
| CN | 1780656 | A | 5/2006 |
| CN | 101154740 | A | 4/2008 |
| CN | 101008087 | B | 8/2010 |
| CN | 102191511 | A | 9/2011 |
| DE | 10250263 | A1 | 7/2004 |
| FR | 2791659 | A1 | 10/2000 |
| JP | 2002-231259 | A | 8/2002 |

OTHER PUBLICATIONS

Supplemental Search Report dated Jul. 19, 2016 for Chinese Patent Application No. 201310542196.2. (1 Page).

First Office Action dated Jun. 22, 2016 for Chinese Patent Application No. 201310542196.2 (7 pages—with English machine Translation).

First Search Report and Supplemental Search Report dated Jun. 12, 2016 for Chinese Patent Application No. 201310542196.2. (3 pages).

Written Opinion of the International Searching Authority for International Application No. PCT/CN2014/090252 (8 pages in Chinese with English machine translation).

International Preliminary Report on Patentability for International Application No. PCT/CN2014/090252 (10 pages in Chinese with English machine translation).

Notification to Grant Patent Right for Invention Aug. 1, 2016 for Chinese Patent Application No. 201310542196.2. (3 pages—with English machine Translation).

Junfeng Zhou, et al. Anionic polysulfone ionomers and membranes containing fluorenyl groups for anionic fuel cells. Journal of Power Sources 190 (2009) pp. 285-292.

Shanfu Lu, et al. Alkaline Polymer electrolyte fuel cells completely free from noble metal catalysts. Proceedings of the National Academy of Sciences in the U.S.A. Dec. 30, 2008, vol. 105, No. 52, pp. 20611-20614 and supporting information pp. 1-12.

* cited by examiner

ELECTROCHEMICAL METHOD FOR PRODUCING PURE-OXYGEN GAS AND OXYGEN-LEAN GAS FROM OXYGEN-CONTAINING GAS MIXTURES

TECHNICAL FIELD

The present invention relates to an electrochemical method for continuously separating and producing a pure-oxygen gas and an oxygen-lean gas (taking oxygen-lean air as an example) from an oxygen-containing gas mixture (taking air as an example) by using an electrochemical technology, and particularly to a method for continuously producing a pure-oxygen gas and an oxygen-lean gas by combining fuel cells with water electrolysis technologies.

BACKGROUND

For industry, a method for producing a pure-oxygen gas is mainly a cryogenic method of cryogenic rectification of liquefied air, which has the drawbacks of huge equipment size and process complexity, and is only suitable for large-scale industrial production. Although molecular sieve pressure swing adsorption (PSA) method is suitable for indoor fields, the purity of the obtained oxygen is not higher than 95%. In the water electrolysis process represented by solid electrolyte water electrolysis technology, pure oxygen and pure hydrogen are produced at anode and cathode of a water electrolyzer at the same time and their purities can reach up to 99.99%, respectively. An operating solid electrolyte water electrolyzer has high current density (1-3 A/cm$^2$) with above 85% of energy efficiency, and is safe, reliable and durable (only pure water is needed and electrolyte solution not required), and of compact structure, small volume and light weight. However, the power consumption for producing a pure-oxygen gas by solid electrolyte water electrolysis is relatively high, i.e. 8-10 kWH per cubic meter of oxygen. In addition, if the hydrogen produced at cathode of the water electrolyzer is not utilized, the hydrogen energy is not only wasted, but also the potential hydrogen safety issues related to its easy combustion and explosion do exist.

With respect to above-mentioned issues related to hydrogen safety, in China patents (Nos. 02114162.2 and 201110105892.8), water electrolyzers and hydrogen fuel cells are combined. Hydrogen generated by water electrolyzers flows in the hydrogen fuel cells to generate power. In the China patent No. 02114162.2, a dual power supply consisting of hydrogen fuel cells and one direct current (DC) supply by the rectification of an externally-connected alternating current (AC) of 220 V is used, which provide power to the water electrolyzers simultaneously. In a dual power supply, if the voltage of the externally-connected power supply is higher than the voltage of the fuel cells under operation, the fuel cells would be damaged by reverse charging. Due to the factors such as the load instability of the water electrolyzer, etc., in practical use, it is difficult to guarantee that the dual power supply can run stably, reliably and efficiently. In addition, because the electric energy collected by the hydrogen fuel cells only takes up about 30-40% of the consumed electric energy of the water electrolyzer, namely, 5-7 kWH per cubic meter of oxygen is still required, hence the operation cost for producing a pure-oxygen gas is still relatively high. Moreover, this patent is only suitable for the sites where the AC of 220 V is accessible. In the China patent No. 201110105892.8, to solve the problems of the dual power supply and the sites limitation (by accessibility of external AC power), a secondary battery is used to supply power to the water electrolyzer, and the secondary battery is charged by the hydrogen fuel cells in a floating charging way. However, because of being inhibited by the power capacity of a secondary battery and impeded by the problem of relatively high energy cost of water electrolysis, the limited amount of electric energy stored in the secondary battery will be quickly consumed during operation, so that the secondary battery must be recharged by an external power supply after operation for a while and restart to work. A device for producing an oxygen gas by this patent is only suitable for an intermittent use at low flow rate and of short time.

SUMMARY OF THE INVENTION

To solve the above-mentioned technical problems existing in the prior art, the present invention provides an electrochemical method for stably and continuously producing a pure-oxygen gas and an oxygen-lean gas from an oxygen-containing gas mixture at low operation cost for any indoor and outdoor fields or a remote area.

The present invention features the technical solution, an electrochemical method for continuous separation of a pure-oxygen gas and an oxygen-lean gas (among oxygen-lean gases, taking oxygen-lean air as an example) from an oxygen-containing gas mixture (among oxygen-containing gas mixtures, taking air as an example), and particularly a method for continuous separation of a pure-oxygen gas and an oxygen-lean gas by combining fuel cells with water electrolysis technologies.

The oxygen-containing gas mixture is air or a gas mixture containing oxygen and a non-oxidative gas (such as at least one of nitrogen, inert gas, carbon dioxide, methane, etc.). The volume concentration of oxygen in the oxygen-containing gas mixture ranges from 1 to 999999 ppm (0.0001-99.9999%).

Terms of "negative electrode" and "positive electrode" for fuel cells (galvanic cells) and "anode" and "cathode" for water electrolyzer (electrolysis cells) would be used below for easy description.

Two water electrolyzer units and two power supply units are used at least, of which each former solely corresponds to each latter. The two power supply units are composed of a recycling hydrogen energy unit and an externally-connected power supply unit. The former unit of recycling hydrogen energy consists of hydrogen fuel cells, and the latter unit of externally-connected power supply is comprised of at least one of the following cells and/or power supply, e.g. a solar cells, direct methanol fuel cells, and/or an AC grid. In terms of electrical circuit, each power supply unit is solely connected with the corresponding water electrolyzer unit. Hydrogen produced by each water electrolyzer unit is gathered through a hydrogen pipe, and delivered to feed the hydrogen fuel cells as a fuel, and oxygen generated by each water electrolyzer unit is gathered and flows out through an oxygen pipe, namely the pure oxygen is produced. A negative electrode and a positive electrode of the hydrogen fuel cells of the power supply unit of recycling hydrogen energy are fed by hydrogen and an oxygen-containing gas mixture, respectively. Through a pipe its hydrogen inlet is connected to a cathode of hydrogen chamber of the water electrolyzer unit. A gas-liquid separation is performed at the outlet of positive electrode, of which the exhaust gas is produced as an oxygen-lean gas. Alternatively, the outlet gas of positive electrode after gas-liquid separation flows in the positive electrode of auxiliary hydrogen fuel cells again, the hydrogen generated at cathode of water electrolyzer partially flows in the negative electrode, an external circuit of the auxiliary hydrogen fuel cells connects with a load and an amperometer for monitoring, and the outlet gas of the positive electrode can be an oxygen-free gas.

The anode and the cathode of the water electrolyzer unit are separated by an electrolyte membrane, and are connected to the positive electrode and the negative electrode of the power supply unit, respectively. The electrolyte membrane can be an acidic and/or alkaline polymer electrolyte membrane, or an electrolyte membrane of an acid or alkali impregnated porous membrane. In an acidic system or an alkaline system, hydrated protons or hydroxide ions migrate through the electrolyte membrane under the internal electric field to generate hydrogen gas at the cathode, and generate oxygen gas at the anode. The electrolyte membrane can be made of an acidic polymer electrolyte material represented by perfluorinated sulfonic acid resin, sulfonated polyether ether ketone or sulfonatedpolysulfone and/or an alkaline polymer electrolyte material represented by alkaline quaternary ammonium polysulfone (Shanfu Lu, et al. Proc. Natl. Acad. Sci. U.S.A. 2008, 105, 20611; Junfeng Zhou, et al. J. Power Sources. 2009, 190, 285). The active component of cathode electrocatalyst is Pt black or Pt/C for hydrogen evolution reaction, with the loading of active component in a membrane assembly electrode (MEA) ranging from 0.01 to 1 mg/cm$^2$, while that of anode is made of at least one metal(s) or metal oxide(s), of which the metal would be the transition metal of VIII family in the periodic table of elements (China patent No. CN101008087 B), with the loading ranging from 0.01 to 4 mg/cm$^2$.

For the power supply unit of hydrogen fuel cells, the positive electrode and the negative electrode are separated by an electrolyte membrane to form two gas chambers. The gas chamber at the negative electrode is connected to the hydrogen pipe allowing the hydrogen generated by the water electrolyzer unit to flow in, and the gas chamber at the positive electrode is fed by the oxygen-containing gas mixture to satisfy the oxygen demanded by the hydrogen fuel cells using a fan or an air pump. At least one of the following steps can be performed on the outlet gas of the gas chamber at the positive electrode after gas-liquid separation, (1) to be vented to the outside, or used as a protective inert gas, and (2) to deoxygenate deep to obtain the oxygen-free gas. For the latter, the outlet gas of the positive electrode flows again in the positive electrode of auxiliary hydrogen fuel cells, the hydrogen generated by the water electrolyzer partially flows into the negative electrode of the auxiliary hydrogen fuel cells, and the external circuit of the auxiliary hydrogen fuel cells is connected with a load and an amperometer for monitoring, and the outlet gas of the positive electrode of the auxiliary hydrogen fuel cells is the oxygen-free gas. For the purpose of recycling water, water generated at the positive electrode of the hydrogen fuel cells of the power supply unit flows in a gas-liquid separator along with the outlet gas, and after gas-liquid separation the water flows back to the negative electrode and/or the positive electrode of the water electrolyzer. If the water loss caused by volatilization or evaporation factors is not taken into account, no extra water is required to refill for the system. As a result, not only the weight of device is reduced, but also the operation cost of consumed pure water is greatly reduced. The electrolyte membrane can be an acidic and/or alkaline polymer electrolyte membrane, or an electrolyte membrane of an acid or alkali impregnating porous membrane. The electrolyte membrane can be made of an acidic polymer electrolyte material represented by perfluorinated sulfonic acid resin, sulfonated polyether ether ketone or sulfonated polysulfone and/or an alkaline polymer electrolyte material represented by alkaline quaternary ammonium polysulfone (Shanfu Lu, et al. Proc. Natl. Acad. Sci. U.S.A. 2008, 105, 20611; Junfeng Zhou, et al. J. Power Sources. 2009, 190, 285). The active component of electrocatalyst at negative electrode is Pt black or Pt/C for hydrogen oxidation reaction, with the loading of active component in MEA ranging from 0.01 to 1 mg/cm$^2$, while that of positive electrode is made of at least one metal(s) or metal oxide(s), of which the metal would be the transition metal of VIII family in the periodic table of elements (China patent No. CN101008087 B), with the loading ranging from 0.01 to 4 mg/cm$^2$.

For the circuit connection, the cathode and the anode of the water electrolyzer are connected with the negative electrode and the positive electrode of the hydrogen fuel cells, respectively.

A main unit consists of fuel cells and water electrolyzer, an auxiliary unit 1 has a water electrolyzer to supply extra hydrogen (to reimburse the energy loss of the main unit allowing the continuous running) to the fuel cells of main unit, and an auxiliary unit 2 has fuel cells in order to deoxygenate deep. The main unit, the auxiliary unit 1 and the auxiliary unit 2 are only in connection with each other by gas path, but not in circuit connection with each other. The auxiliary unit 2 (fuel cells for deep deoxygenation) and the auxiliary unit 1 (water electrolyzer to supply extra hydrogen to the fuel cells of main unit) are only connected by hydrogen gas path. The positive electrode of the hydrogen fuel cells of the auxiliary unit 2 is connected to that of the hydrogen fuel cells of the main unit through a gas-liquid separator. Hydrogen gas path of the water electrolyzer at cathode is connected to that of negative electrode of the fuel cells.

A power supply unit of the direct methanol fuel cells generates and supplies power to the water electrolyzer by using methanol as a fuel to flow in the negative electrode, and using an oxygen-containing gas as an oxidizer to flow in the positive electrode.

A power supply unit of the solar cells generates and supplies power to the water electrolyzer by directly using a commercial product of the solar cells that is compatible with the water electrolyzers in terms of voltage and power.

A power supply unit of the AC grid generates and supplies power to the water electrolyzer by directly using a commercial product of a DC power supply to convert the AC grid, which is compatible with the water electrolyzer in terms of voltage and power.

For producing a pure-oxygen gas on an indoor site, since it is convenient to access the AC grid, preferably, the externally-connected power supply unit uses a solar cell and a DC power supply of the external AC grid simultaneously, which can not only conserve electric energy and reduce operation cost, but also can overcome the uncontrollability drawback of the solar energy.

For producing a pure-oxygen gas on an outdoor site or in a remote area, since it is inconvenient or difficult to access the AC grid, preferably, the externally-connected power supply unit uses a solar cell and a direct methanol fuel cell simultaneously, which can not only fully take the accessibility advantage of solar energy on the outdoor site or the remote area, but also can overcome the shortcomings of the uncontrollable solar energy and inconvenience or inaccessibility of the AC grid.

The present invention provides a method for continuously separating and producing a pure-oxygen gas and an oxygen-lean gas (taking oxygen-lean air as an example) from an oxygen-containing gas mixture (taking air as an example) by using an electrochemical technology, particularly a method for continuously producing a pure-oxygen gas and an oxygen-lean gas by combining fuel cells with water electrolysis technologies. The present invention employs at least two water electrolyzer units and two power supply units, of which each former solely corresponds to each latter, allowing the system to operate continuously, stably and reliably; and a power supply unit of recycling hydrogen energy recollects the hydrogen energy generated from water electrolysis, thereby conserving energy and solving the issues related to hydrogen safety. The solar cells simultaneously with either the AC grid or the direct methanol fuel cells as the externally-connected power supply unit, exhibit not only the further reduced power consumption by using solar energy, but also the productions of a pure-oxygen gas and an oxygen-lean gas which can be stably and continuously generated for any indoor and outdoor sites or remote areas.

The present invention possesses the following advantages that:

1. For a conventional method, the power consumption for producing a pure-oxygen gas by solid electrolyte water electrolysis is relatively high, i.e. 8-10 kWH per cubic meter oxygen being required. In addition, if the hydrogen produced at cathode of the water electrolyzer is not utilized, the hydrogen energy is not only wasted, but also potential issues of hydrogen safety related to easy combustion and explosion exist. Compared with the conventional method, the method of the present patent features the advantages that while producing oxygen by water electrolysis, hydrogen is recycled to generate and partially supply power to the water electrolyzer so as to produce more oxygen, hence the energy efficiency is higher; and hydrogen is produced by water electrolysis and subsequently consumed by fuel cells, thus no net hydrogen is produced in the system, so that the system is used more safely.

2. In the China patent No. 02114162.2, a dual power supply consisting of one DC supplier obtained by hydrogen fuel cells and the other DC supplier by the rectification of an externally-connected AC of 220 V is used, which supplies power to the water electrolyzers simultaneously. In a dual power supply circuit, if the voltage of the externally-connected power supply is higher than the voltage of the operating fuel cells, the fuel cells would be damaged by reverse charging. Because of the factors such as instability, etc. of the load of the water electrolyzer, in practical use, it is difficult to guarantee that the dual power supply circuit can operate stably, reliably and efficiently. In addition, because the electric energy collected by the hydrogen fuel cells only takes up about 30-40% of the consumed electric energy of the water electrolyzer, i.e. 5-7 kWH per cubic meter of oxygen being required, the operation cost for producing a pure-oxygen gas is still relatively high. Moreover, the patent is only suitable for the sites where the AC of 220 V can be accessible. Compared with the China patent No. 02114162.2, the method of the present patent has the advantage that in terms of the electrical circuit, each power supply unit is solely connected with the corresponding water electrolyzer unit. The externally-connected power supply unit is comprised of at least one of the following cells and/or power supply, e.g. solar cells, direct methanol fuel cells, and/or an AC grid. The method of the present patent is suitable for continuously and stably producing a pure-oxygen gas and an oxygen-lean gas on any indoor and outdoor sites or in a remote area.

3. In the China patent No. 201110105892.8, to solve the problems of dual power supply and the sites limitation (by accessibility of external AC power), a secondary battery is used to supply power to the water electrolyzer, and the secondary battery is charged by the hydrogen fuel cells in a floating charging way. However, because of being limited by the power capacity of a secondary battery and impeded by the problem of relatively high energy cost of water electrolysis, the limited amount of electric energy stored in the secondary battery will be quickly consumed during operation, so that the secondary battery must be recharged by an external power supply after operation for a while and restart to work. A device for producing an oxygen gas by this patent is only suitable for an intermittent use at low flow rate and of short time. In the method of the present patent, extra hydrogen produced by the auxiliary unit that combines the externally-connected power supply unit with the water electrolyzer, feeds the fuel cells to enable it to generate power so as to reimburse the energy loss of the main unit that combines the fuel cells with the water electrolyzer, instead of using a secondary battery to supply electric energy so as to reimburse the energy loss. Because of being limited by the energy storage capacity of a secondary battery, the China patent No. 201110105892.8 provides a limited-capacity or intermittent method for producing an oxygen gas. The present patent is suitable for continuously and stably producing a pure-oxygen gas and an oxygen-lean gas on any indoor and outdoor sites or in a remote area.

BRIEF DESCRIPTION OF THE DRAWINGS

FIG, 1 shows a gas path connection relationship for a first embodiment.

DESCRIPTION OF THE DRAWINGS

Figure 1:
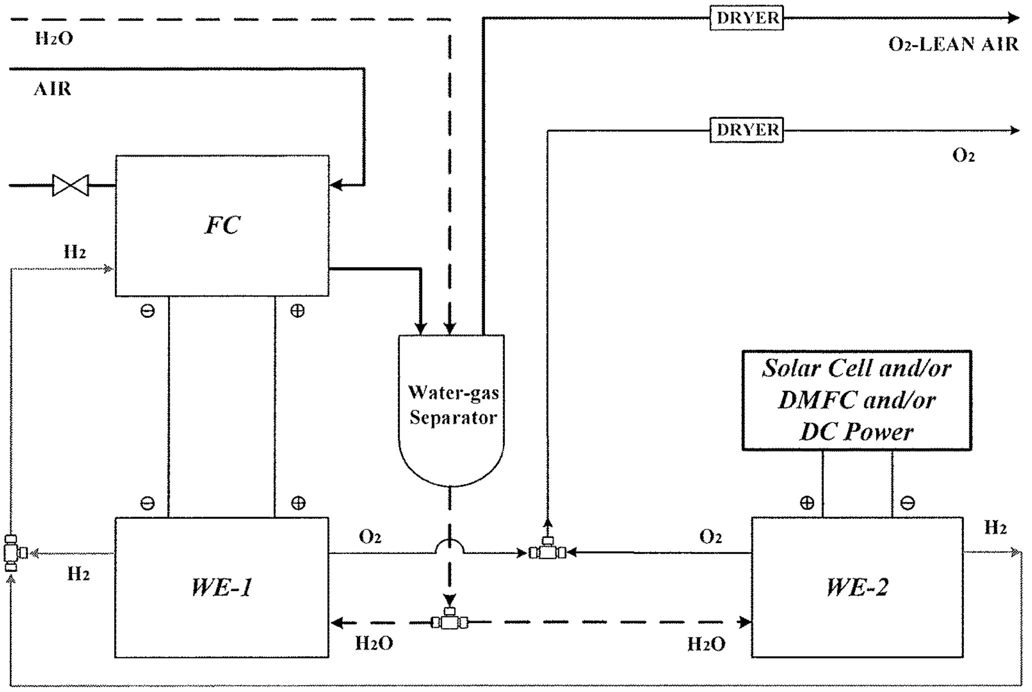

A gas path connection relationship shown in FIG. 1 is as follows: a main unit consists of (a) fuel cell(s) FC and a water electrolyzer WE-1, an auxiliary unit consists of a water electrolyzer WE-2 to supply extra hydrogen for the fuel cells of main unit (to reimburse the energy loss of the main unit allowing the continuous running), and an externally-connected power supply unit, wherein the externally-connected power supply unit is comprised of at least one of the following cells and/or power supply, e.g. solar cells, direct methanol fuel cells, and/or an AC grid. The main unit and the auxiliary units are only in connection with each other by gas path, but not in circuit connection with each other. Hydrogen gas paths of the water electrolyzers WE-1 and WE-2 at cathode are connected with that of negative electrode of the fuel cell(s) FC. After the outlet gas of anode of the water electrolyzers WE-1 and WE-2 passes through a drier, a pure-oxygen gas is obtained. The positive electrode of the fuel cell(s) FC is fed by an oxygen-containing gas (taking air as an example), and after the reactions the outlet gas passes through a gas-liquid separator and the drier, an oxygen-lean gas (taking oxygen-lean air as an example) is obtained. An outlet at the positive electrode of the fuel cell(s) FC is connected with a gas-liquid separator of a water storage unit, and for the purpose of recycling water, after gas-liquid separation the water flows back to the anode of the water electrolyzer WE-1 of the main unit and the water electrolyzer WE-2 of the auxiliary unit. Because of the inevitable factor of vapor evaporation, an appropriate amount of water is refilled into the separator of the water storage unit to maintain the material balance of water of the overall system.

A circuit connection relationship shown in FIG. 1 is as follows: the negative electrode and positive electrode of the fuel cell(s) FC-1 are connected with the cathode and anode of the water electrolyzer WE-1, respectively. The negative electrode and positive electrode of the DC power supply of the externally-connected power supply unit are connected with the cathode and anode of the water electrolyzer WE-2, respectively.

Figure 2:
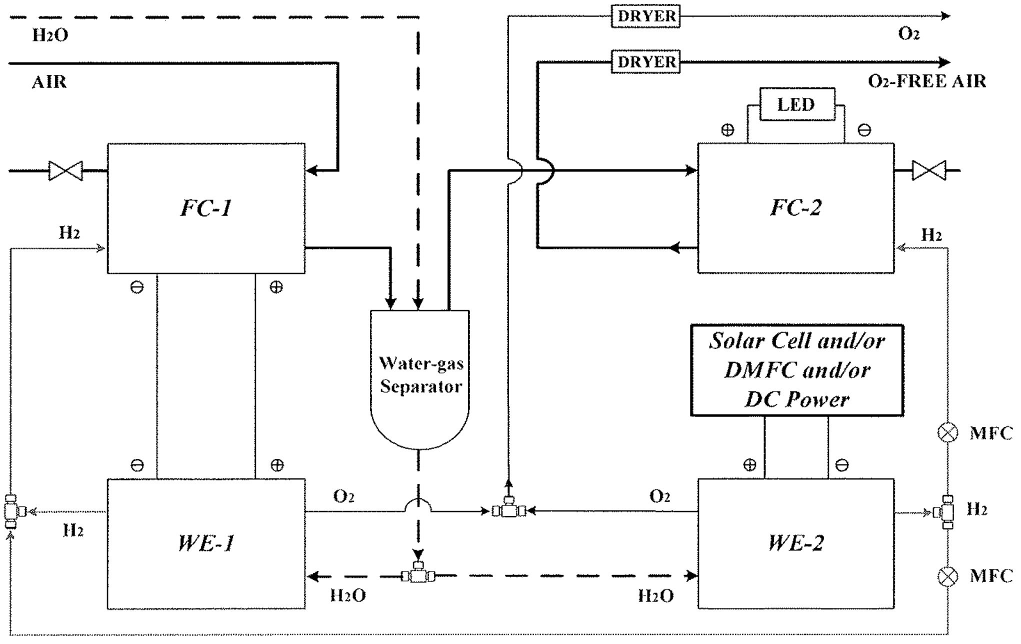
FIG. 2 shows a gas path connection relationship for a second embodiment.

A gas path connection relationship shown FIG. 2 is as follows: a main unit consists of (a) fuel cell(s) FC-1 and a water electrolyzer WE-1; an auxiliary unit 1 consists of a water electrolyzer WE-2 to supply extra hydrogen for the fuel cells of main unit (to reimburse the energy loss of the main unit allowing the continuous running), and an externally-connected power supply unit, wherein the externally-connected power supply unit is comprised of at least one of the following cells and/or power supply, e.g. solar cells, direct methanol fuel cells, and/or an AC grid; and an auxiliary unit 2 consists of (a) fuel cell(s) FC-2 to deoxygenate deep. The main unit, the auxiliary unit 1 and the auxiliary unit 2 are only in connection with each other by gas path, but not in circuit connection with each other.

Hydrogen gas path of the water electrolyzers WE-1 and WE-2 at cathode is connected with that of negative electrode of the fuel cell(s) FC, and the hydrogen produced at the cathode of the water electrolyzer WE-2 partially flows in the negative electrode of the FC-2. After the outlet gas of anode of the water electrolyzers WE-1 and WE-2 passes through a drier, a pure-oxygen gas is obtained. The positive electrode of the fuel cell(s) FC-1 is fed by an oxygen-containing gas (taking air as an example), and after the reactions the outlet gas passes through the gas-liquid separator of the water storage unit, flows in the positive electrode of the fuel cell FC-2, and passes through the drier, an oxygen-lean (deoxygenated deep) gas or an oxygen-free gas (taking oxygen-lean (deoxygenated deep) air or oxygen-free air as an example) is obtained. An outlet at the positive electrode of the fuel cell(s) FC-1 is connected with the gas-liquid separator of the water storage unit, and for the purpose of recycling water, after gas-liquid separation the water flows back to the anode of the water electrolyzer WE-1 and the water electrolyzer WE-2. Because of the inevitable factor of vapor evaporation, an appropriate amount of water is refilled into the separator of the water storage unit to maintain the material balance of water of the overall system.

A circuit connection relationship shown FIG. 2 is as follows: the negative electrode and positive electrode of the fuel cell(s) FC-1 are connected with the cathode and anode of the water electrolyzer WE-1, respectively. The negative electrode and positive electrode of the DC power supply of the externally-connected power supply unit are connected with the cathode and anode of the water electrolyzer WE-2, respectively. The circuit of the fuel cell(s) FC-2 is connected with a load or an LED lamp, and an amperometer for monitoring.

FIG. 1 shows a flow diagram of an electrochemical method for producing a pure-oxygen gas and an oxygen-lean gas (taking oxygen-lean air as an example) from an oxygen-containing gas mixture (taking air as an example). Symbols of FC and WE-1 in the figure represent the fuel cell(s) FC and the water electrolyzer WE-1 of the main unit respectively; WE-2 represents the water electrolyzer WE-2 of the auxiliary unit; Water-gas Separator represents the gas-liquid separator of the water storage unit; Solar Cell and/or DMFC and/or DC power represent at least one of the following cells and/or power supply, e.g. solar cells, direct methanol fuel cells, and/or an AC grid; and the inlet AIR and $H_2O$, and the outlet $O_2$-Lean Air and $O_2$ of the system represent input (inlet) air and water, and output (outlet) oxygen-lean air and oxygen, respectively.

In FIG. 1, taking air as an example, the externally-connected power supply unit of the auxiliary unit is connected with the water electrolyzer WE-2 to produce hydrogen and supply the hydrogen for the fuel cell(s) FC of the main unit so as to initiate the overall system and reimburse the energy loss of the main unit allowing the continuous running in a normal way. The externally-connected power supply unit is comprised of at least one of the following cells and/or power supply, e.g. solar cells, direct methanol fuel cells, and/or an AC grid. The negative electrode and positive electrode of the fuel cell(s) FC of the main unit are fed by the hydrogen gas and an air, respectively, to generate and supply power to the water electrolyzer WE-1 of the main unit, and hydrogen produced by water electrolysis is circularly supplied for the fuel cell(s) once again, to perform the cyclic utilization of hydrogen.

The outlet gas of the positive electrode of the fuel cell(s) FC passes through the gas-liquid separator and the drier to flow out an oxygen-lean air. The outlet gas of the anode of the water electrolyzers WE-1, WE-2 passes through the dryer to flow out a pure-oxygen gas.

For the purpose of recycling water, water produced at the positive electrode of the fuel cell(s) FC flows back to the gas-liquid separator of the water storage unit through a water pipe to be condensed and collected, and delivered to the anode of the water electrolyzer. If the water loss caused by volatilization or evaporation factors is not taken into account, no extra water is required to refill. Since inevitable loss caused by water vapor evaporation in gas path is taken into account, water can be appropriately supplied in the water storage unit.

Therefore, the input of the overall system is air that is supplied for the fuel cell(s) FC of the main unit and the water (appropriately refilled) for reimbursing vapor evaporation loss; and the output is a pure-oxygen gas obtained after the outlet gas of the anode of the water electrolyzer WE-1 of the main unit and the water electrolyzer WE-2 of the auxiliary unit 1 is dried, and an oxygen-lean air obtained after the outlet gas of the positive electrode of the fuel cell(s) FC of the main unit passes through the gas-liquid separator and the drier.

FIG. 2 shows a flow diagram of an electrochemical method for continuously producing a pure-oxygen gas and an oxygen-free gas (taking oxygen-free air as an example) from an oxygen-containing gas mixture (taking air as an example). Symbols FC-1 and WE-1 in the figure represent the fuel cell(s) FC-1 and the water electrolyzer WE-1 of the main unit respectively; WE-2 represents the water electrolyzer WE-2 of the auxiliary unit 1; FC-2 represents the fuel cell(s) of the auxiliary unit 2 (LED lamp signs of ON and OFF indicate running and no running of the fuel cells, respectively); Water-gas Separator represents the gas-liquid separator of the water storage unit; Solar Cell and/or DMFC and/or DC power represent at least one of the following cells and/or power supply, e.g. solar cells, direct methanol fuel cells and an AC grid of the externally-connected power supply of the auxiliary unit 1; and the input (inlet) AIR and $H_2O$, and the output (outlet) $O_2$-FreeAir and $O_2$ of the system represent input air and water and output oxygen-free air and oxygen, respectively.

In FIG. 2, taking air as an example, the externally-connected power supply unit of the auxiliary unit 1 is connected with the water electrolyzer WE-2 to produce hydrogen and partially supply the hydrogen for the fuel cell(s) FC-1 of the main unit so as to initiate the overall system and reimburse the energy loss of the main unit allowing the continuous running in a normal way. The externally-connected power supply unit is comprised of at least one of the following cells and/or power supply, e.g. solar cells, direct methanol fuel cells and an AC grid. The negative electrode and positive electrode of the fuel cell(s) FC-1 of the main unit are fed by the hydrogen gas and an air, respectively, to generate power and supply the power to the water electrolyzer WE-1 of the main unit, and hydrogen produced by water electrolysis is circularly supplied for the fuel cell once again, to perform the cyclic utilization of hydrogen.

The oxygen-lean air of the outlet gas of the positive electrode of the fuel cell(s) FC-1 passing through the gas-liquid separator flows in the positive electrode of the fuel cell(s) FC-2 of the auxiliary unit 2 once again, and partial hydrogen of the water electrolyzer WE-2 of the auxiliary unit 1 flows in the negative electrode of the fuel cell(s) FC-2 of the auxiliary unit 2. The fuel cell(s) FC-2 of the auxiliary unit 2 can deoxygenate deep to obtain the oxygen-free air. The outlet gas of the anode of the water electrolyzers WE-1 and WE-2 passes through a dryer to flow out a pure-oxygen gas.

For the purpose of recycling water, water produced at the positive electrode of the fuel cell(s) FC-1 flows in a gas-liquid separator along with the outlet gas, and after gas-liquid separation the water flows back to the anode of the water electrolyzers WE-1 and WE-2. If water loss caused by volatilization or evaporation factors is not taken into account, no extra water is not required to refill. If inevitable loss caused by water vapor evaporation in gas path is taken into account, water can be appropriately supplied in the water storage unit.

Therefore, the input (inlet) of the overall system is air that is supplied for the fuel cell(s) FC-1 of the main unit and the water (appropriately refilled) for reimbursing vapor evaporation loss; and the output is an oxygen gas of the anode of the water electrolyzer WE-1 of the main unit and the water electrolyzer WE-2 of the auxiliary unit 1, and an oxygen-free air of the positive electrode of the fuel cell(s) FC-2 of the auxiliary unit 2.

DETAILED DESCRIPTION

Embodiment 1

A 40 $cm^2$ Nafion 212 membrane (EW=1052 $g/mol_{SO3H}$), was dissolved into a solvent mixture of 20 ml N-methyl-2-pyrrolidone and 10 ml isopropyl alcohol with heating to obtain a perfluorinated sulfonic acid solution. The perfluorinated sulfonic acid solution was cast on a flat plate, followed by heat treatment of 70° C. for 10 hours, temperature increase up to 77° C., 77° C. for 12 hours until the solvents were almost volatilized, 130° C. for 1 hour in a vacuum oven to form a substrate membrane. As a result, through above procedures a polymer electrolyte membrane with 18 μm in thickness for the fuel cells and a solid polymer electrolyte membrane with 50 μm in thickness for water electrolyzer were prepared.

SGL carbon paper, polytetrafluoroethylene emulsion, XC-72 carbon powder, 5% Nafion® solution (DuPont Company) and 20% Pt/C catalyst were used to prepare electrodes, wherein the mass ratio of Nafion® resin to C is 0.8. The Pt loadings of the negative electrode and positive electrode are 0.3 $mg/cm^2$ and 0.5 $mg/cm^2$, respectively. Membrane electrode assemblies (MEA) with 5 $cm^2$ of active area were prepared using hydraulic (oil) presser under conditions of a preliminary step of pressing at a little pressure for 1 minute at 160° C., pressure increase up to 2 MPa, and hot-pressing at 2 MPa for 2 minutes, followed by cooling to obtain as-prepared MEAs for fuel cells.

SGL carbon paper, polytetrafluoroethylene emulsion, XC-72 carbon powder, 5% Nafion® solution (DuPont Company, EW=1100 g/mol-$SO_3H$) and 20% Pt/C catalyst for cathode, Pt black and $IrO_2$catalyst for the anode were used to prepare electrodes, respectively. At cathode the mass ratio of Nafion® resin to C is 0.8. At anode the mass ratio of Pt black and $IrO_2$powder to Nafion® resin (EW=1100 g/mol-$SO_3H$) is 5:1. The catalyst and the Nafion® resin solution were ultrasonicated and dispersed in isopropyl alcohol for 12 hours to obtain a slurry for the preparation of catalyst layer of anode. The Pt loadings of cathode and anode is 0.3 $mg/cm^2$ and 4 $mg/cm^2$, respectively. MEAs with 5 $cm^2$ of active area were prepared using hydraulic (oil) presser under conditions of a preliminary step of pressing at a little pressure for 1 minute at 160° C., pressure increase up to 2 MPa, and hot-pressing at 2 MPa for 2 minutes, followed by cooling to obtain as-prepared MEAs for solid electrolyte water electrolyzers.

The fuel cells were evaluated under conditions of dry $H_2$/AIR, ambient pressure, cell operation temperature $T_{cell}$=30-80° C., $m_{Pt,MEA}$=0.7 $mg/cm^2$, single cell test, recycling hydrogen, 100 ml/min of air flow rate, 5 $cm^2$ of effective electrode area.

The water electrolyzer was evaluated under conditions of cell operation temperature of the water electrolyzer $T_{cell}$=45° C., ambient pressure, 15 ml/min of water flow rate, single cell test, 5 $cm^2$ of effective electrode area. A current-stabilized DC power supply (Model MPS30DC) was used to supply power.

FIG. 1 shows the flow chart of the overall system. After stable operation for 2 hours, Table 1 shows the measured data of current and voltage. In the overall system, the input is air with a flow rate of 100 ml/min, and water refilled at a rate of 10 ml/day. The output is a pure-oxygen gas of 20 ml/min and an oxygen-lean air of 80 ml/min.

TABLE 1

Electrochemical experimental data of embodiment 1

| | Main unit | | Auxiliary unit 1 WE-2 | |
|---|---|---|---|---|
| | FC | WE-1 | single cell 1 (water electrolyzer) | single cell 2 (water electrolyzer) |
| Current/A | 0.95 | 0.95 | 1.01 | 1.01 |
| Voltage/V | 1.9 | 1.9 | 2.02 | 2.01 |

Embodiment 2

A 60 g sulfonatedpolysulfone (with degree of sulphonation of 60%), was dissolved in a solvent mixture of 10 mlN, N-dimethylacetamide and 5 ml ethyl ether and n-butyl alcohol with heating in a closed vial. A porous polytetrafluoroethylene membrane (90 μm in thickness, 0.09 μm in pore size, and 90% in porosity) was tightened on a stainless steel frame. The above sulfonatedpolysulfone solution was cast onto the porous polytetrafluoroethylene film, followed by heat treatment of 60° C. for 24 hours, temperature increase up to 75° C., 75° C. for 10 hours and 100° C. for 2 hours in a vacuum oven to form a substrate membrane until the solvents were almost volatilized. As a result, through above procedures, solid electrolyte water electrolyzer membranes with 50 μm in thickness were prepared.

A 30 $cm^2$ Nafion 212 membrane (EW=1052 $g/mol_{SO3H}$), was dissolved into a solvent mixture of 10 ml N-methyl-2-pyrrolidone and 25 ml isopropyl alcohol with heating to obtain a perfluorinated sulfonic acid solution. The perfluorinated sulfonic acid solution was cast on a flat plate, followed by heat treatment of 65° C. for 10 hours, temperature increase up to 78° C., 78° C. for 14 hours until the solvents were almost vaporized, 130° C. for 0.5 hour in a vacuum oven to form a substrate membrane. As a result, through above procedures a polymer electrolyte membrane with 20 μm in thickness for the fuel cells was prepared.

Torry carbon paper, polytetrafluoroethylene emulsion, XC-72 carbon powder, 5% Nafion® solution (DuPont Company) and 40% Pt/C catalyst were used to prepare electrodes, wherein the mass ratio of Nafion® resin to C is 0.6. The Pt loadings of the negative electrode and positive electrode are 0.15 $mg/cm^2$ and 0.6 $mg/cm^2$, respectively. Membrane electrode assemblies (MEA) with 5 $cm^2$ of active area were prepared using hydraulic (oil) presser under conditions of a preliminary step of pressing at a little pressure for 1 minute at 160° C., pressure increase up to 2 MPa, and hot-pressing at 2 MPa for 2 minutes, followed by cooling to obtain as-prepared MEAs for fuel cells.

SGL carbon paper, polytetrafluoroethylene emulsion, XC-72 carbon powder, 5% Nafion® solution (DuPont Company, EW=1100 g/mol-$SO_3H$) and Pt black catalyst for cathode, Pt black and $IrO_2$ catalyst for the anode were used to prepare electrodes, respectively. At anode the mass ratio of Pt black and $IrO_2$ powder to Nafion® resin (EW=1100 g/mol-$SO_3H$) is 5:1. The catalyst and the Nafion® resin solution were ultrasonicated and dispersed in isopropyl alcohol for 12 hours to obtain a slurry for the preparation of catalyst layer of anode. The Pt loadings of cathode and anode is 0.4 $mg/cm^2$ and 2 $mg/cm^2$, respectively. MEAs with 5 $cm^2$ of active area were prepared using hydraulic (oil) presser under conditions of a preliminary step of pressing at a little pressure for 1 minute at 160° C., pressure increase up to 2 MPa, and hot-pressing at 2 MPa for 2 minutes, followed by cooling to obtain as-prepared MEAs for solid electrolyte water electrolyzers.

The fuel cells were evaluated under conditions of dry $H_2$/AIR, ambient pressure, cell operation temperature $T_{cell}$=30-80° C., $m_{Pt,MEA}$=0.7 $mg/cm^2$, single cell test, recycling hydrogen, 100 ml/min of air flow rate, 5 $cm^2$ of effective electrode area.

The water electrolyzer was evaluated under conditions of cell operation temperature of the water electrolyzer $T_{cell}$=45° C., ambient pressure, 20 ml/min of water flow rate, single cell test, 5 $cm^2$ of effective electrode area. A current-stabilized DC power supply of portable direct methanol fuel cells (DMFC) was used to supply power.

The flow structure of the overall system is as shown in FIG. 2, and after 2 hours of stable operation, the measured current voltage output data is as shown in Table 2. In the overall system, air is inlet in 100 ml/min, meanwhile, water is supplemented in 15 ml/day; and pure oxygen is output in 18 ml/min, and oxygen-free air is inlet in 72 ml/min.

FIG. 2 shows the flow chart of the overall system. After stable operation for 2 hours, Table 2 shows the measured data of current and voltage. In the overall system, the input is air with a flow rate of 100 ml/min, and water refilled at a rate of 15 ml/day. The output is a pure-oxygen gas of 18 ml/min and an oxygen-lean air of 82 ml/min.

TABLE 2

Electrochemical experimental data of embodiment 2

| | Main unit | | Auxiliary unit 1 WE-2 | | Auxiliary unit 2 FC-2 |
|---|---|---|---|---|---|
| | FC-1 | WE-1 | single cell 1 (water electrolyzer) | single cell2 (water electrolyzer) | LED lamp |
| Current/A | 1.0 | 1.0 | 1.25 | 1.25 | ON |
| voltage/V | 2.0 | 2.0 | 2.5 | 2.5 | |

The present invention employs at least two water electrolyzer units and two power supply units, of which each former solely corresponds to each latter, allowing the system to operate continuously, stably and reliably; and a power supply unit of recycling hydrogen energy recollects the hydrogen energy generated from water electrolysis, thereby conserving energy and solving the issues related to hydrogen safety.

The solar cells simultaneously with either the AC grid or the direct methanol fuel cells as the externally-connected power supply unit, exhibit not only the further reduced power consumption by using solar energy, but also the productions of a pure-oxygen gas and an oxygen-lean gas which can be stably and continuously generated for any indoor and outdoor sites or remote areas.

In terms of solving the issues related to the energy loss of the matter cycling between fuel cells and the water electrolyzer when they are running, in the present patent, extra hydrogen of the cathode of the water electrolyzer of the auxiliary unit, feeds the of the negative electrode of the fuel cells of the main unit. The extra hydrogen is capable to generate power through the fuel cells, to reimburse the energy loss of the matter cycling between the fuel cells and the water electrolyzer in the main unit when they are running. However, in the China patent No. 02114162.2, a dual power supply consisting of one DC supplier obtained by hydrogen fuel cells and the other DC supplier by the rectification of an externally-connected AC of 220 V is used, which supplies power to the water electrolyzers simultaneously, to reimburse the above-mentioned energy loss. Two problems exist, (1) if the voltage of the externally-connected power supply is higher than the voltage of the operating fuel cells, the fuel cells would be damaged by reverse charging, and (2) because of the factors such as instability, etc. of the load of the water electrolyzer, in practical use, it is difficult to guarantee that the dual power supply circuit can operate stably, reliably and efficiently. Therefore, in the present patent, for the purpose of reimbursing energy loss of the matter cycling between the fuel cell and the water electrolyzer, the method of provision of extra hydrogen has two advantages, (1) the fuel cells being prevented from damage arising from by reverse charging, and (2) the fuel cells of the main unit as a sole power supply to provide power to the water electrolyzer, featuring a circuit of being stable, reliable and efficient.

The invention claimed is:

1. An electrochemical method for producing a pure-oxygen gas and an oxygen-lean gas from an oxygen-containing gas mixtures, the method comprising:

using at least two water electrolyzer units and at least two power supply units, of which each former solely corresponds to each latter, respectively;

wherein the at least two power supply units are at least one power supply unit of recycling hydrogen energy and one externally-connected power supply unit; the power supply unit of recycling hydrogen energy consists of hydrogen fuel cells, and the externally-connected power supply unit is comprised of at least one of the following cells and/or power supply: (a) solar cell(s), (a) direct methanol fuel cell(s), and/or an external alternating current grid;

in terms of an electrical circuit of the at least two water electrolyzers units, each power supply unit is solely connected with the corresponding water electrolyzer unit;

hydrogen produced by all the water electrolyzer units is gathered through a hydrogen pipe, and delivered to feed the hydrogen fuel cells as a fuel, and oxygen produced by all the water electrolyzer units is gathered and flows out through an oxygen pipe, so that the pure oxygen gas is produced;

a negative electrode and a positive electrode of the hydrogen fuel cells of the power supply unit of recycling hydrogen energy are fed by the hydrogen gas from the hydrogen pipe and an oxygen-containing gas mixture, respectively; the inlet hydrogen gas is connected with a cathode chamber of the water electrolyzer unit through a pipe, and a gas-liquid separation is performed at the outlet of positive electrode of the hydrogen fuel cell(s), of which the outlet gas is produced as an oxygen-lean gas and;

a main unit consists of at least one hydrogen fuel cell and one water electrolyzer;

a first auxiliary unit consists of at least one water electrolyzer, which is electrically connected with the externally-connected power supply unit, and is used for supplying hydrogen for the hydrogen fuel cells;

a second auxiliary unit consists of at least hydrogen fuel cells, which is used for further deoxygenating the oxygen-lean gas; and the main unit, the first auxiliary unit and the second auxiliary unit are only in connection with each other by gas path, but not in electrical circuit connection with each other; the second auxiliary unit and the first auxiliary unit (1) are only connected by hydrogen gas path; a positive electrode of the hydrogen fuel cells of the second auxiliary unit is connected with that of the hydrogen fuel cells of the main unit through a gas-liquid separator to supply the oxygen-lean gas; and the hydrogen gas path of the first auxiliary unit of the water electrolyzer at the cathode is connected with the negative electrode of the fuel cells of the second auxiliary unit; and the hydrogen fuel cells and the water electrolyzers constituting the main unit are in electrical circuit connection with each other in one-to-one correspondence; and an external circuit of an auxiliary hydrogen fuel cell of the second auxiliary unit is only connected with an amperometer for monitoring a current or a load, and is not in circuit connection with any water electrolyzer;

wherein a further deoxygenated gas is obtained from the second auxiliary unit or if no current passes through the external circuit, it indicates that the inlet gas of the positive electrode of the second auxiliary unit hydrogen fuel cell is an oxygen-free gas.

2. The electrochemical method of claim 1, characterized in that:

an anode and the cathode of said water electrolyzer units are separated by an electrolyte membrane, and are connected with a positive electrode and a negative electrode of the power supply unit, respectively.

3. The electrochemical method of claim 1, characterized in that;

the positive electrode and the negative electrode of the hydrogen fuel cells of said power supply unit are separated by an electrolyte membrane to form two gas chambers; the gas chamber at the negative electrode is connected with the hydrogen pipe allowing the hydrogen produced by the water electrolyzer unit to flow in, and the gas chamber at the positive electrode is fed by the oxygen-containing gas mixture to satisfy the oxygen demanded by the hydrogen fuel cells using a fan or an air pump;

at least one of the following steps can be performed on the outlet oxygen-lean gas of the gas chamber at the positive electrode of the hydrogen fuel cells after gas-liquid separation, (1) to be vented to the outside, or used as a protective inert gas, and (2) to be further deoxygenated to obtain an oxygen-free gas.

4. The electrochemical method of claim 1, characterized in that:

for the purpose of recycling water, water produced at the positive electrode of the hydrogen fuel cells of the power supply unit flows into a gas-liquid separator along with the outlet gas, and after gas-liquid separation the water flows back to the cathode and/or anode of the water electrolyzer.

5. The electrochemical method of claim 1, characterized in that:

the cathode and anode of one of the at least two water electrolyzer of the water electrolyzer units are connected with the negative electrode and the positive electrode of the hydrogen fuel cells.

6. The electrochemical method of claim 1, characterized in that:

a power supply unit of the direct methanol fuel cells produces and supplies power to the water electrolyzer by using methanol as a fuel to flow in a negative electrode, and using an oxygen-containing gas as an oxidizer to flow in a positive electrode; alternatively, a power supply unit of the solar cells produces and supplies power to the water electrolyzer by directly using a commercial product of solar cells that is compatible with the water electrolyzers in terms of voltage and power; alternatively, a power supply unit of the alternating current grid produces and supplies power to the water electrolyzer by directly using a commercial product of a direct current power supply to convert the alternating current grid, which is compatible with the water electrolyzer in terms of voltage and power.

7. The electrochemical method of claim 1, characterized in that:

the externally-connected power supply unit uses the solar cells and the alternating current grid, or the solar cells and the direct methanol fuel cells simultaneously.

* * * * *